Dec. 8, 1936.          F. G. RUF            2,063,627
COMBINED WAGON AND SLED
Filed Aug. 14, 1935          2 Sheets-Sheet 1

WITNESSES
Edw. Thorpe
D.W. Foster

INVENTOR
Frank G. Ruf
BY
Munn Anderson Liddy
ATTORNEY

Dec. 8, 1936.  F. G. RUF  2,063,627
COMBINED WAGON AND SLED
Filed Aug. 14, 1935  2 Sheets-Sheet 2

WITNESSES
Edw. Thorpe
A. O. Foster

INVENTOR
Frank G. Ruf
BY
Munn Anderson Liddy
ATTORNEY

Patented Dec. 8, 1936

2,063,627

UNITED STATES PATENT OFFICE 2,063,627

COMBINED WAGON AND SLED

Frank G. Ruf, New York, N. Y.

Application August 14, 1935, Serial No. 36,192

2 Claims. (Cl. 280—8)

This invention relates to a combined wagon and sled.

An object of the invention is to provide a vehicle which is reversible, and which, when in one position, functions as a wagon, and when reversed functions as a sled.

More specifically, the invention includes a platform supported when in one position by hollow runners which partially house wheels so that when in one position the vehicle is supported on the runners and operates as a sled and when turned upside down or reversed is supported on the wheels and operates as a wagon.

A further object is to provide a vehicle of this character embodying many features of novelty and novel combinations and arrangements of parts, all of which will be more fully hereinafter described and pointed out in the claims.

In the accompanying drawings—

Figure 1:
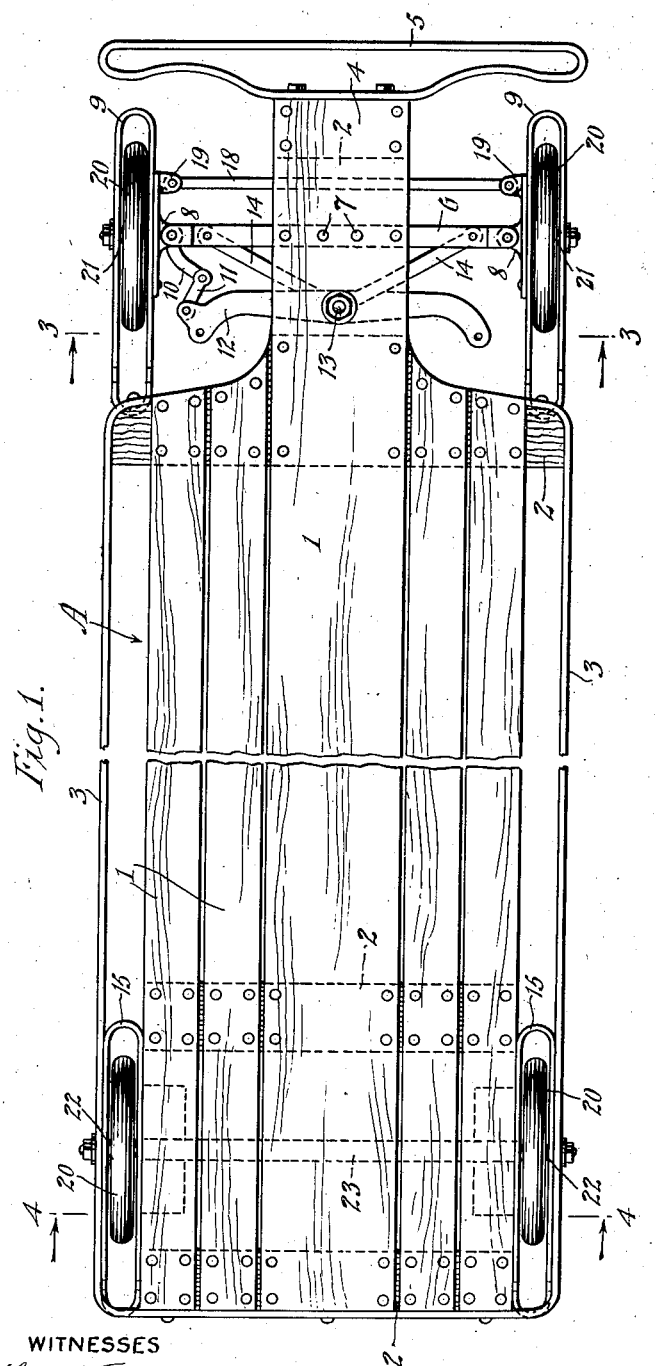
Figure 1 is a broken view in plan showing my improved vehicle in position to function as a sled.
Figure 2:
Figure 2 is a view in side elevation of Figure 1.
Figure 3:
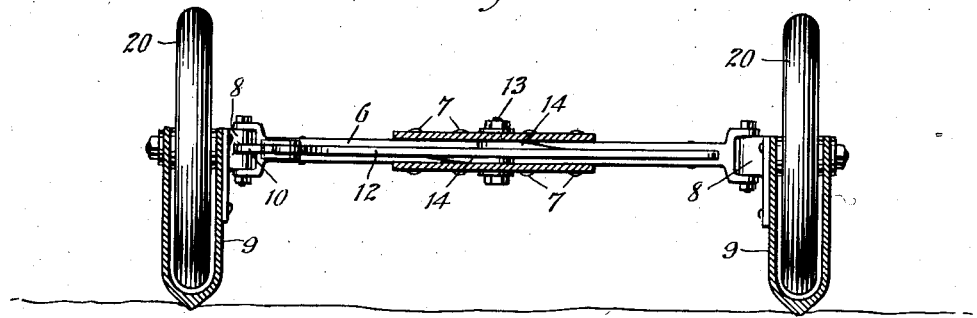
Figure 3 is a view in transverse section on the line 3, 3 of Figure 1.
Figure 4:
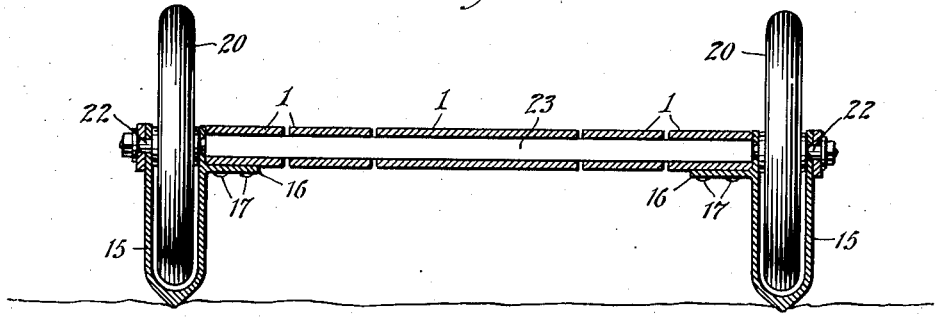
Figure 4 is a view in transverse section on the line 4, 4 of Figure 1.

A indicates generally the platform or body portion of the vehicle. This platform A comprises any desirable number of longitudinally extending slats 1 secured to any desired number of transverse bars or filler pieces 2. Slats 1 are located above and below the filler pieces so that the platform constitutes a double platform and a metal strap or band 3 outlines the sides and rear end of the platform and is secured to a forward transverse bar 2 as well as to other portions of the platform so as to provide a strong and rigid metal border for the platform. The central bars or slats 1 extend forwardly beyond the other slats or bars constituting a forward extension 4 of platform A which is appreciably more narrow than the main portion of the platform as clearly indicated. Any suitable form of bumper 5 may be secured to the forward end of extension 4 and a transversely extending axle 6 extends through the extension 4 in the rear of the bumper and is rigidly secured to the extension by rivets or other suitable securing means 7. Pivoted knuckles 8 are connected to the ends of axle 6 and in turn are rigidly secured to hollow runners 9. One of the knuckles 8 has a crank arm 10 thereon which is connected by a link 11 with one end of a steering cross bar 12. This cross bar 12 extends through the extension 4 and is pivotally mounted on a bolt 13 extending through the extension and strengthened by angular braces 14 which are secured to axle 6. Similar hollow runners 15 are located at the sides and adjacent the rear of the platform A between the outermost slats 1 and the metal strap 3 and are formed with integral laterally projecting plates 16 extending under the platform and rigidly secured thereto by rivets or other securing means 17. The forward runners 9 in advance of axle 8 are connected by a link 18 which is pivotally connected to perforated brackets 19 on the runners 9 so as to insure the runners moving in unison. As above stated, all of the runners—both the forward runners 9 and the rear runners 15—are hollow, that is to say, they are closed throughout their sides, front and rear ends, and bottoms, and are suitably shaped on the bottom to constitute runners. The tops of these runners are open and in the runners, wheels 20 have a rotary mounting and the wheels are partially housed in the runners, but project above the runners so that when the vehicle is reversed it will be supported on the wheels and not upon the runners as indicated in the drawings. These wheels 9 may of course be mounted in the runners in various ways. I have illustrated the front wheels as supported on short stubs 21 constituting extensions of the knuckles 8 and the rear wheels as supported upon cylindrical ends 22 of an axle 23 which extends through the platform and is rigidly secured therein.

The operation of the device with the parts as shown in the drawings is as follows:

The operator seated or reclining upon the platform A can steer the vehicle by movement of the steering bar 12, causing the front runners 9 to be moved at an angle or to maintain them in a straight position as desired. This is also true when the vehicle is reversed and functioning as a wagon as the movement of the front runners necessarily cause the front wheels 20 to move at the desired angle.

While I have set forth a specific construction embodying certain details it is to be distinctly understood that I desire to cover broadly the idea of a vehicle which is reversible and constitutes, when in one position, a wheeled vehicle or wagon, and when in its reversed or other position constitutes a sled, and when in either of these positions is capable of being steered or guided in accordance with the wishes of the operator.

Therefore, while I have illustrated and described what I believe to be a preferred embodiment of my invention, it is obvious that various changes might be made in the general form and arrangement of parts without departing from my invention, and hence I do not limit myself to the precise details set forth but consider myself at liberty to make such changes and alterations as fairly fall within the spirit and scope of the appended claims.

I claim:

1. A combined wagon and sled including a double platform, a front axle extending through the double platform, a rear axle extending through the double platform, knuckles pivotally connected to the front axle, hollow runners rigidly connected to the knuckles, a crank arm on one of the knuckles, a steering bar extending through the platform pivotally connected thereto intermediate its ends and connected at one end to the crank arm and wheels partially housed in the runners, a link pivotally connecting the forward runners in advance of the forward axle and angular braces connected to the forward axle embracing the pivot of the steering bar.

2. A combined wagon and sled, including a platform consisting of upper and lower longitudinally extending slats, transverse filler bars between the slats and to which the slats are fixed, the intermediate slats extending beyond the other slats and constituting a forward extension of the platform, a metal strap or bar outlining the sides and rear of the platform, a bumper on the forward end of the extension, a forward axle extending through the extension, hollow runners pivotally connected to the forward axle, means for pivoting the forward runners to steer the vehicle, a rear axle extending through the platform, other hollow runners located between the edges of the outside slats and the said outlining strap, integral plates on said last mentioned runners fixed to the bottom of the platform, and wheels mounted in all of the hollow runners and partially housed within the runners.

FRANK G. RUF.